United States Patent Office 3,749,725
Patented July 31, 1973

3,749,725
SUBSTITUTED 3,3-DIPHENYLPIPERAZINES AND 3,3-DIPHENYLPIPERAZIN-2-ONES
Meier E. Freed, Paoli, and Scott J. Childress, Philadelphia, Pa., assignors to American Home Products Corporation, New York, N.Y.
No Drawing. Original application Dec. 23, 1968, Ser. No. 786,367, now Patent No. 3,631,047, dated Dec. 28, 1971. Divided and this application July 9, 1971, Ser. No. 161,322
Int. Cl. C07d 51/70
U.S. Cl. 260—268 R  3 Claims

ABSTRACT OF THE DISCLOSURE

The disclosure is directed to substituted 3,3-diphenylpiperazines, substituted 3,3-diphenylpiperazin-2-ones and related compounds. The compounds are useful as sympathomimetic agents as evidenced by their production of mydriasis in standard laboratory animals.

---

This application is a division of our application 786,367 filed Dec. 23, 1968, which issued on Dec. 28, 1971 as Pat. No. 3,631,047.

This invention relates to a new class of piperazine compounds and to a method for their preparation. More particularly, it relates to substituted 3,3-diphenylpiperazines and substituted 3,3-diphenylpiperazin-2-ones. The compounds of this invention may be represented by the formula:

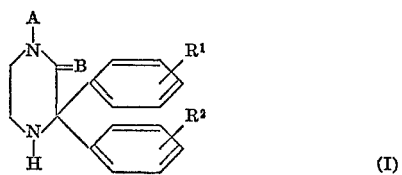

Where

A is selected from the class consisting of lower alkyl, phenyl, halophenyl, trifluoromethylphenyl, lower alkylphenyl, lower alkoxyphenyl, phenoxy (lower) alkyl, halophenoxy (lower) alkyl, trifluoromethylphenoxy (lower) alkyl, lower alkylphenoxy (lower) alkyl, lower alkoxyphenoxy (lower) alkyl, hydroxy (lower) alkyl, omega-hydroxy-omega-phenyl (lower) alkyl, omega-amino (lower) alkyl, omega-(lower)alkylamino (lower) alkyl, omega-di(lower)alkylamino (lower) alkyl, pyrrolidino (lower) alkyl, piperidino (lower) alkyl, and morpholino (lower) alkyl, hydrogen, lower alkanoyl, benzoyl and lower alkoxycarbonyl, B is selected from the class consisting of oxo [O] and hydrogen $[(H)_2]$ with the proviso that when B is oxo, A is not hydrogen, lower alkanoyl, benzoyl and lower alkoxycarbonyl; and $R^1$ and $R^2$ are the same or different members selected from the class consisting of hydrogen, halogen, lower alkyl and lower alkoxy.

As used herein the terms "lower alkyl," "lower alkoxy" and the like describe groups containing from one to about five carbon atoms, provided that lower alkyl groups contain from two to about four carbon atoms when they are part of the pyrrolidino (lower) alkyl, piperidino (lower) alkyl and morpholino (lower) alkyl groups.

Typical examples of the compounds of this invention are 1 - (2-phenethyl)-3,3-diphenylpiperazine and 1-(3-dimethylaminopropyl)-3,3-diphenyl-2-piperazinone.

The new and useful compounds of this invention may be prepared by the process which is hereinafter schematically illustrated:

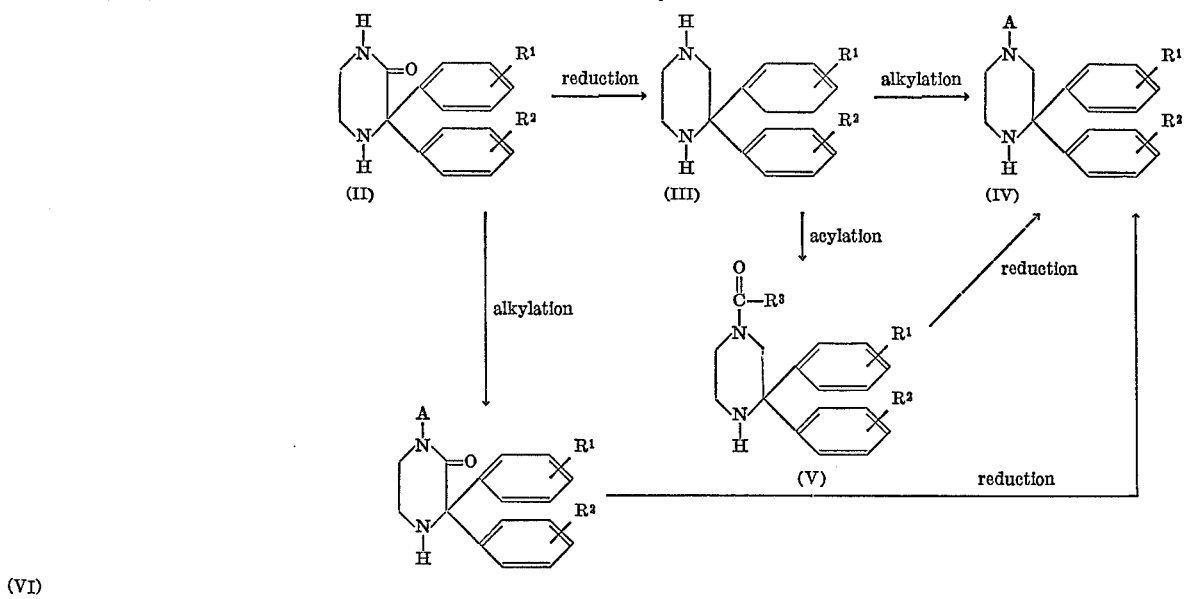

Where A, $R^1$ and $R^2$ are as defined above, and $R^3$ is lower alkyl or aryl.

Many of the starting compounds utilized in the preparation of the compounds of the present invention are known compounds which are readily available from commercial sources, while others can be easily prepared in accordance with standard organic procedures well-known to those skilled in the art.

Because the nitrogen containing compounds of the present invention are basic, advantage may be taken of the water solubility of salts of these compounds formed with acids in the isolation and/or purification of the above compounds for oral or parenteral administration. Of course, only salts formed with pharmacologically-acceptable acids should be employed in therapeutic applications. Particularly effective salts are those formed with pharmacologically-acceptable acids having a pH value of 3 or lower. Such acids are well-known in the art, for example: hydrochloric, hydrobromic, hydroiodic, sulfuric, nitric, phosphoric, acetic, lactic, citric, tartaric, maleic, gluconic, fumaric, benzenesulfonic, toluenesulfonic, methanesulfonic, ethanesulfonic acids and the like. These salts may be prepared by procedures commonly employed in the art, for example, reacting the compound with an equivalent weight of the selected acid in aqueous solution and concentration of the solution. Other known procedures may also be employed.

The preparation of the 1-substituted-3,3-diphenylpiperazine (IV) is carried out in two steps by one of three alternate routes as shown above. In one route 3,3-diphenylpiperazin-2-one (II) is reacted with a reducing agent, such as lithium aluminum hydride, diborane or the like to form 2,2-diphenylpiperazine (III). The reaction may be carried out in an organic solvent medium such as ether, dioxane, tetrahydrofuran at a temperature range of about 0 to 100° C. for about 6 to 72 hours. Preferably the reaction is carried out at a temperature range of about 30 to 70° C. for about 12 to 36 hours.

The compound (III) may then be alkylated with an appropriate alkylating agent such as an alkyl halide or an epoxide to add the desired alkyl substituent and results in the 1 - substituted-3,3-diphenylpiperazine (IV). The reaction is preferably carried out in an organic solvent medium at a temperature range of about 25 to 135° C. for a period of about 1 to 18 hours. Preferably the reaction is carried out at a temperature range of about 45 to 100° C. for a period of about 6 to 12 hours. When the reaction is complete the products may be recovered and separated by well-known techniques. For instance, the reaction mixture may be filtered and the filter cake washed with tetrahydrofuran, and then with methanol. The filtrates may be combined and concentrated under vacuum. The residue may be redissolved in ether and dried over magnesium sulfate, filtered and concentrated to obtain the product.

Alternately, the compound (III) is then acylated with an appropriate acylating agent, such as an acyl halide or haloformate, to produce the acylated 3,3-diphenylpiperazine (V). The latter compound (V) may then be reduced with an appropriate reducing agent such as lithium aluminum hydride, to form the 1-substituted-3,3-diphenylpiperazine (IV) product of the present invention. The reaction is preferably carried out in an organic solvent medium at a temperature range of about 0 to 100° C. for a period of about 6 to 72 hours. Preferably the reaction is carried out at a temperature range of about 30 to 70° C. for a period of about 12 to 36 hours.

When the reaction is complete the products may be recovered and separated by well-known techniques.

Another route for the formation of 1-substituted-3,3-diphenylpiperazine (IV) consists of alkylating a 3,3-diphenylpiperazin-2-one with a halogen derivative of the substituent desired to be added in the 1-position in a suspension of sodium hydride or the like in an organic solvent medium, such as dimethylformamide or the like to form the 1-substituted-3,3-diphenylpiperazinone (VI). The reaction is preferably carried out at a temperature range of about 0 to 100° C. for a period of about 1 to 24 hours. Preferably the reaction is carried out at a temperature range of about 30 to 75° C. for a period of about 6 to 12 hours. The latter is then reduced with an appropriate reducing agent such as lithium aluminum hydride as described above, to form the 1-substituted - 3,3 - diphenylpiperazine (IV) product of the present invention. When the reaction is complete the products may be recovered and separated by well-known techniques.

The 1-substituted-3,3-diphenylpiperazine (IV) and 1-substituted-3,3-diphenyl-2-piperazinone (VI) of the present invention have utility in experimental pharmacology. The compounds are sympathomimetic agents which is particularly evidenced by their production of mydriasis in a host.

In the pharmacological evaluation of the compounds as mydriatic agents the in vivo effects are tested as follows. The compound to be tested is administered intraperitoneally to three mice (14 to 24 grams) at each of the following doses: 400, 127, 40 and 12.7 milligrams per kilogram of host body weight (mg./kg.). The animals are watched for a minimum of two hours during which time signs of general stimulation (that is, increased spontaneous motor activity, hyperactivity on tactile stimulation, twitching), general depression (that is, decreased spontaneous motor activity, decreased respiration) and autonomic activity (that is miosis, mydriasis, diarrhea) are noted.

The compounds of the present invention in the above test procedure were shown to be mydriatic agents at dosages of 4, 12.7, 127 and 400 milligrams per kilogram of the body weight of the host (mg./kg.).

When the compounds of this invention are employed as described above, they may be administered alone or in combination with pharmacologically acceptable carriers, the proportion of which is determined by the solubility and chemical nature of the compound, chosen route of administration and standard pharmacological practice. For example, they may be administered orally in the form of tablets or capsules containing such excipients as starch, milk, sugar, certain types of clay and so forth. They may be administered sublingually in the form of troches or lozenges in which the active ingredient is mixed with sugar and corn syrups, and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects.

In order more clearly to disclose the nature of the present invention, specific examples of the practice of the invention are hereinafter given. It should be understood, however, that this is done solely by way of example and is intended neither to delineate the scope of the invention nor limit the ambit of the appended claims.

In the examples the following abbreviations are used which are well-known in the art: $\phi$ for phenyl and $\phi O$ for phenoxy. Other abbreviations used are also well-known: g. for grams, ml. for milliliter, mole for gram molecular weight, etc.

EXAMPLE 1

The following example illustrates the preparation of 2,2-diphenylpiperazine dihydrochloride, a compound of Formula III.

The reaction may be illustrated:

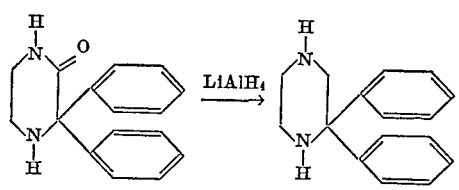

To a stirred suspension of lithium aluminum hydride (84.4 grams, 2.22 mole) in dry tetrahydrofuran (2 liters), in a 5 liter 3-necked flask fitted with a seal-type stirrer, dropping funnel and condenser fitted with a calcium chloride filled drying tube, was added, in portions, 3,3-diphenylpiperazine-2-one (140 grams, 0.555 mole). The reaction was heated at reflux for 3 hours, stirred overnight at room temperature, and then refluxed again for 6 hours and cooled in an ice-bath. The reaction mixture was decomposed by the cautious addition of water (255 milliliters) and stirred 3 hours at room temperature. The inorganic material was filtered off and the filter-cake washed wtih tetrahydrofuran, then with methanol. Combined filtrates were concentrated under reduced pressure. The residue was taken up in anhydrous ether (15000 ml.), filtered clear and again concentrated. Residue solidified after standing several days. The yield was 121.9 grams equal to 92.1% of theoretical yield. Treatment of an ether solution of 2,2-diphenylpiperazine with dry hydrogen chloride gave a white dihydrochloride which was filtered off, washed with ether, dried and recrystallized from methanol-isopropanol. The melting point of the product was 292–294° C.

Based on the formula $C_{16}H_{20}N_2Cl_2$, it was calculated that the elemental analysis by weight would be 61.72 percent carbon, 6.47 percent hydrogen, 8.99 percent nitrogen and 22.78 percent chlorine. The product was analysed and the content was found to be 61.71 percent carbon, 6.26 percent hydrogen, 9.05 percent nitrogen, and 22.70 percent chlorine. The foregoing may be expressed:

Analysis calculated for $C_{16}H_{20}H_2Cl_2$ (percent): C, 61.72; H, 6.47; N, 8.99; Cl, 22.78. Found (percent): C, 61.71; H, 6.26; N, 9.05; Cl, 22.70.

In the pharmacological evaluation described above, the product was found to be mydriatic agent at 4 mg./kg. administered orally. The highest non-lethal dose administered was 127 mg./kg.

EXAMPLE 2–27

Following the procedure of Example 1 but substituting appropriate reactants for 3,3-diphenylpiperazin-2-one, the following substituents of $R^1$ and $R^2$ are added when B is $(H)_2$, and $R^3$ is hydrogen:

| Example | $R^1$ | $R^2$ |
|---|---|---|
| 2 | Cl | H |
| 3 | F | H |
| 4 | Br | H |
| 5 | I | H |
| 6 | Cl | Cl |
| 7 | F | Cl |
| 8 | Br | Cl |
| 9 | I | F |
| 10 | $CH_3$ | H |
| 11 | $C_2H_5$ | H |
| 12 | $C_3H_7$ | H |
| 13 | $C_4H_9$ | H |
| 14 | $CH_3$ | $CH_3$ |
| 15 | $C_2H_5$ | $C_2H_5$ |
| 16 | $C_3H_7$ | $CH_3$ |
| 17 | $C_4H_9$ | $C_2H_5$ |
| 18 | $CH_3O$ | H |
| 19 | $C_2H_5O$ | H |
| 20 | $C_3H_7O$ | H |
| 21 | $C_4H_9O$ | H |
| 22 | $CH_3O$ | $CH_3O$ |
| 23 | $C_2H_5O$ | $C_2H_5O$ |
| 24 | $C_3H_7O$ | $C_2H_5O$ |
| 25 | $C_4H_9O$ | $CH_3O$ |
| 26 | Cl | $CH_3$ |
| 27 | $C_2H_5$ | $CH_3O$ |

EXAMPLE 28

The following example illustrates the preparation of 1-ethoxycarbonyl-3,3-diphenylpiperazine, a compound of Formula V and 1-methyl-3,3-diphenylpiperazine, hydrochloride, a compound of Formula IV.

The reaction may be illustrated:

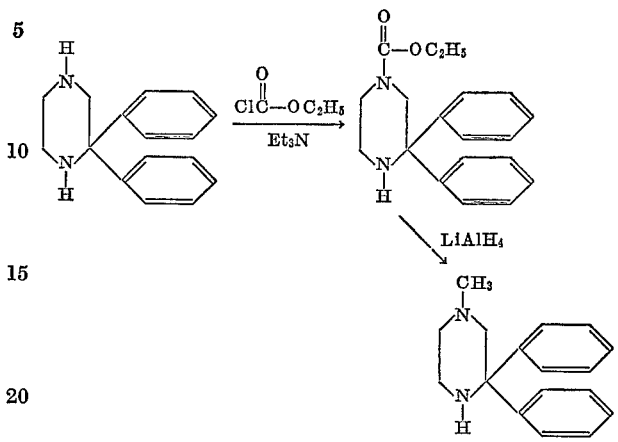

A solution of 2,2-diphenylpiperazine (15.7 grams, 0.0242 mole), triethylamine (5.4 grams, 0.0532 mole) and ether (100 ml.) was cooled to 3° C. A solution of ethyl chloroformate (5.78 grams, 0.0532 mole) in ether (50 ml.) was added at 3–9° C. over a period of ¼ hour. The mixture was stirred in the ice-bath for 1 hour, then at room temperature for 5 hours. The solid was filtered off to give 4.34 grams of triethylamine hydrochloride. The filtrate was concentrated under vacuum. The residue was dissolved in ether (200 ml.) and treated with saturated ethanolic hydrogen chloride to pH 1. The hydrochloride of the product, 1-ethoxycarbonyl-3,3-diphenylpiperazine, separated as an oil from the ether. On standing this oil solidified. It was filtered off, washed with ether, and dried. The yield was 6.65 grams having a melting point of 228–231° C., being equivalent to a 79.3 percent yield.

The hydrochloride was converted back to base by suspending it in 75 ml. water and adding 50 percent aqueous sodium hydroxide to raise the pH to 12. A solid formed which was extracted into ether, washed with saline, dried over magnesium sulfate and filtered clear. This filtrate was concentrated under vacuum. The residue (4.6 grams) was dissolved in dry tetrahydrofuran (75 ml.) and added to a stirred suspension of lithium aluminum hydride (0.86 grams, 0.0225 mole) in 50 ml. of tetrahydrofuran, refluxed 28 hours and cooled. Water (4 ml.) was added slowly, stirred several hours, and filtered. The filter-cake was washed first with tetrahydrofuran and then with methanol. The filtrates were combined and concentrated under reduced pressure. The residue was redissolved in ether (250 ml.) and dried over magnesium sulfate, filtered and again concentrated. The residue, a yellow oil (4.9 grams) was dissolved in 30 ml. ethanol.

The clear solution was treated with ethanolic hydrogen chloride (pH=1) and diluted to 500 ml. with ether. After standing in the cold (5° C.) a solid formed and was filtered off, washed and dried. The product was recrystallized from methanolacetone and afforded 2.4 grams (56.8 percent of theoretical yield) of white crystals of 1-methyl-3,3-diphenylpiperazine monohydrochloride, having a melting point of 244–245° C.

Analysis calculated for $C_{17}H_{21}ClN_2$ (percent): C, 70.70; H, 7.32; Cl, 12.27; N, 9.70. Found (percent): C, 70.64; H, 7.23; Cl, 11.98; N, 9.47.

In the pharmacological evaluation described above, the product was found to be a mydriatic agent at 12.7 mg./kg. administered orally. The highest non-lethal dose administered was 127 mg./kg.

EXAMPLE 28A

The following illustrates the preparation of 1-acetyl-3,3-diphenylpiperazine, a compound of Formula IV.

To a solution of 2,2-diphenylpiperazine (5.7 g., 0.0242 mole) and triethylamine (2.70 g., 0.0266 mole) in ether (200 ml.) at 10° C. is added, slowly and with stirring and cooling, a solution of acetyl chloride (1.95 g., 0.025 mole) in 50 ml. of ether. Following addition, the reaction mixture is stirred for 1 hour. The solid material (triethylamine hydrochloride) is filtered off and well washed with ether. The solvent is removed from the combined filtrate and washings under reduced pressure, leaving a solid residue of product.

EXAMPLE 28B

The following illustrates the preparation of 1-ethyl-3,3-diphenylpiperazine, a compound of Formula IV.

To a stirred suspension of lithium aluminum hydride (3.8 g., 0.1 mole) in 250 ml. of dry tetrahydrofuran is added slowly a solution of 1-acetyl-3,3-diphenylpiperazine (9.5 g., 0.025 mole) in 150 ml. of tetrahydrofuran. After the addition is completed the reaction mixture is stirred and refluxed 8 hours. After cooling, water (14 ml.) is added slowly and with stirring and cooling. After complete addition the reaction mixture is allowed to stir at room temperature for 2 hours, then filtered. The filter cake is washed well with tetrahydrofuran, then with isopropanol. Solvent is removed from the combined filtrate under reduced pressure. The residue is taken up in ether and treated with dry hydrogen chloride. The precipitated hydrochloride is then filtered off, washed with ether and recrystallized.

EXAMPLE 28C

The following illustrates the preparation of (2-methylpropionyl)-3,3-diphenylpiperazine, a compound of Formula IV.

In the manner of Example 28A, a solution of 2,2-diphenylpiperazine (5.7 g., 0.0242 mole) and triethylamine (2.7 g., 0.0266 mole) in ether is treated with an ethereal solution of (2-methyl)propionyl chloride to give the desired product.

EXAMPLE 28D

The following illustrates the preparation of 1-(2-methylpropyl)-3,3-diphenylpiperazine, a compound of Formula IV.

In the manner of Example 28B, a solution of 1-(2-methylpropionyl)-3,3-diphenylpiperazine (6.2 g., 0.02 mole) in dry tetrayhdrofuran (150 ml.) is added to a stirred suspension of lithium aluminum hydride in 250 ml. of tetrahydrofuran. Following work-up the product is isolated as the hydrochloride.

EXAMPLES 29–54

Following the procedures of Example 28A and Example 28B but substituting appropriate compounds for 2,2-diphenylpiperazine, acetyl chloride, and 1-acetyl-3,3-diphenylpiperazine, the following substituents of $R^2$, $R^1$, and A may be added where B is $(H)_2$:

| Example | $R^1$ | $R^2$ | A |
| --- | --- | --- | --- |
| 29 | Cl | H | $C_2H_5$ |
| 30 | F | H | $C_2H_5$ |
| 31 | Br | H | $C_4H_9$ |
| 32 | I | H | $CH_3$ |
| 33 | Cl | Cl | $C_2H_5$ |
| 34 | F | Cl | $C_3H_7$ |
| 35 | Br | Cl | $C_4H_9$ |
| 36 | I | F | $C_3H_7$ |
| 37 | $CH_3$ | H | $(CH_3)_2CHCH_2$ |
| 38 | $C_2H_5$ | H | $CH_3$ |
| 39 | $C_3H_7$ | H | $C_2H_5$ |
| 40 | $C_4H_9$ | H | $C_4H_9$ |
| 41 | $CH_3$ | $CH_3$ | $C_3H_7$ |
| 42 | $C_2H_5O$ | $C_2H_5$ | $(CH_3)_2CHCH_2$ |
| 43 | $C_3H_7$ | $CH_3$ | $CH_3$ |
| 44 | $C_4H_9$ | $C_2H_5$ | $C_2H_5$ |
| 45 | $CH_3O$ | H | $C_3H_7$ |
| 46 | $C_2H_5O$ | H | $C_3H_7$ |
| 47 | $C_3H_7O$ | H | $C_4H_9$ |
| 48 | $C_4H_9O$ | H | $(CH_3)_2CHCH_2$ |
| 49 | $CH_3$ | $CH_3O$ | $CH_3$ |
| 50 | $C_2H_5O$ | $C_2H_5O$ | $C_2H_5$ |
| 51 | $C_3H_7O$ | $C_2H_5O$ | $C_3H_7$ |
| 52 | $C_4H_9O$ | $CH_3O$ | $C_4H_9$ |
| 53 | Cl | $CH_3$ | $C_3H_7$ |
| 54 | $C_2H_5$ | $CH_3O$ | $(CH_3)_2CHCH_2$ |

EXAMPLE 55

The following example illustrates the preparation of 1-(2-phenethyl-3,3-diphenylpiperazine, a compound of Formula IV.

The reaction may be illustrated:

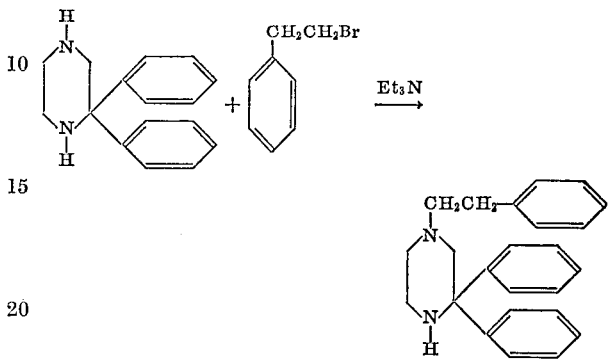

A mixture of 2,2-diphenylpiperazine (5.0 grams, 0.021 mole), phenethylbromide (3.89 grams, 0.021 mole), triethylamine (2.13 grams, 0.021 mole) and toluene (75 ml.) was stirred at reflux for 24 hours. The mixture was cooled and the triethylamine hydrobromide (2.76 grams, having a melting point of 245–247° C.) was filtered off. The filtrate was concentrated. The residue was recrystallized from aqueous ethanol to give 4.80 grams of product 1-(2-phenethyl)-3,3-diphenylpiperazine (66.7 percent of theoretical yield), having a melting point of 88–89.5° C.

Analysis calculated for $C_{24}H_{26}N_2$ (percent): C, 84.17; H, 7.65; N, 8.18. Found (percent): C, 84.35; H, 7.81; N, 8.11.

EXAMPLE 56

Following the procedure used in Example 55, 2,2-diphenylpiperazine is mixed with cinnamyl bromide and heated in an inert solvent for 20–24 hours to obtain 1-cinnamyl-3,3-diphenylpiperazine.

EXAMPLE 57

Following the procedure used in Example 55, 2,2-diphenylpiperazine is mixed with an equivalent amount of morpholinoethyl chloride and heated in an inert solvent for 20–24 hours to obtain 1-(morpholinoethyl)-3,3-diphenylpiperazine.

EXAMPLE 58

The following example illustrates the preparation of 3,3-diphenyl-1-piperazineethanol, a compound of Formula IV.

To a stirred mixture of 2,2 diphenylpiperazine (5.0 g., 0.021 mole), powdered potassium carbonate (4.15 g., 0.03 mole) and benzene (60 ml.) at 45° C., was added a solution of 2-bromoethanol (2.63 g., 0.021 mole) in ¼ hour. The mixture was stirred at reflux for 3¾ hours after the addition had been completed, then it was cooled and filtered. The filtrate was freed of solvent to give the crude product.

A sample of the product was converted to the fumarate by adding 3.888 g. (0.01376 mole) in acetone (50 ml.) to a solution of 0.793 g. (0.00688 mole) fumaric acid in acetone (100 ml.). The salt that separated on cooling was recrystallized twice from methanol-acetone to give the fumarate, 2.13 g.melting at 172–175° C.

Analysis for $C_{20}H_{24}N_2O_3$.—Calculated (percent): C, 70.56; H, 7.11; N, 8.23. Found (percent): C, 70.29; H, 7.24; N, 7.96.

EXAMPLE 59

Following the procedure used in Example 58, 3-bromopropanol is substituted for 2-bromoethanol to obtain 3,3-diphenyl-1-piperazinepropanol.

EXAMPLE 60-76

Following the procedure used in Example 55 but substituting appropriate compounds for 2,2-diphenylpiperazine and phenethylbromide the following substituents for $R^1$, $R^2$, and A may be added when B is hydrogen:

| Example | $R^1$ | $R^2$ | A |
|---|---|---|---|
| 60 | Cl | H | $\phi CH_2$ |
| 61 | Br | H | $\phi CHOHCH_2$ |
| 62 | I | H | $\phi CHOHCH(CH_3)$ |
| 63 | Cl | Cl | $\phi CHOH(CH_2)_3CH_2$ |
| 64 | $C_2H_5$ | H | $\phi(CH_2)_2CH_2$ |
| 65 | $C_3H_7$ | H | $\phi CH_2CH(CH_3)$ |
| 66 | $C_4H_9$ | H | $\phi(CH_2)_3CH_2$ |
| 67 | $CH_3$ | $CH_3$ | $\phi CH_2CH(CH_3)CH_2$ |
| 68 | $C_3H_7$ | $CH_3$ | $C_2H_5OCH_2CH_2$ |
| 69 | $C_4H_9$ | $C_2H_5$ | $CH_3(CH_2)_2O(CH_2)_2CH_2$ |
| 70 | $CH_3O$ | H | $CH_3(CH_2)_2CH_2OCH(CH_3)CH_2$ |
| 71 | $C_2H_5O$ | H | $CH_3O(CH_2)_3CH_2$ |
| 72 | $C_3H_7O$ | H | $C_2H_5OCH_2CH(CH_3)CH_2$ |
| 73 | Cl | H | $\phi CH=CHCH_2$ |
| 74 | $CH_3O$ | $CH_3O$ | $\phi CH=CHCH_2CH_2$ |
| 75 | $C_2H_5O$ | $C_2H_5O$ | $\phi CH_2CH=CHCH_2$ |
| 76 | $C_4H_9O$ | $CH_3O$ | $\phi CH=CHCH_2$ |

EXAMPLE 77

The following example illustrates the preparation of 1-phenoxyethyl-3,3-diphenylpiperazine, a compound of Formula IV.

The reaction may be illustrated:

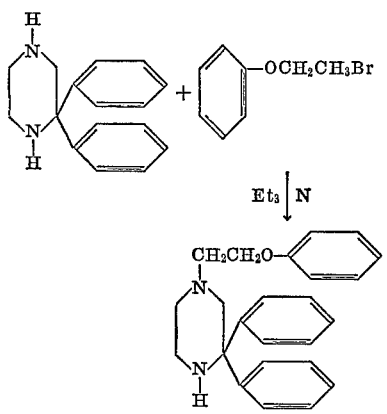

A mixture of 2,2-diphenylpiperazine (5.0 grams, 0.021 mole), β-bromophenetole (4.23 grams, 0.021 mole), triethylamine (2.13 grams, 0.021 mole) and toluene (75 ml.) was stirred at reflux for 24 hours. The mixture was cooled and the triethylamine hydrobromide (3.37 grams, having a melting point of 245-248° C.) was filtered off. The filtrate was concentrated. The residue was recrystallized from aqueous ethanol to give 3.65 grams of product, 1-phenoxyethyl-3,3-diphenylpiperazine (a 48.5 percent of theoretical yield), having a melting point of 95-97.5° C.

Analysis calculated for $C_{24}H_{26}N_2O$ (percent): C, 80.41; H, 7.31; N, 7.82. Found (percent): C, 80.55; H, 7.05; N, 7.67.

In the pharmacological evaluation described above, the product was found to be a mydriatic agent at 12.7 mg./kg. administered parenterally. The highest dose administered was 400 mg./kg. and was non-lethal.

EXAMPLES 78-86

Following the procedure of Example 77 but substituting appropriate compounds for 2,2-diphenylpiperazine and β-bromophenetole the following substituents for $R^1$, $R^2$, and A may be added when B is hydrogen:

| Example | $R^1$ | $R^2$ | A |
|---|---|---|---|
| 78 | $C_2H_5$ | H | $\phi OCH_2CH_2CH_2$ |
| 79 | $C_3H_7$ | H | $\phi OCHCH_2$<br>$\|$<br>$CH_3$ |
| 80 | $C_4H_9$ | H | $\phi O(CH_2)_3CH_2$ |
| 81 | $CH_3$ | $CH_3$ | $\phi OCH_2CH(CH_2CH_3)$ |
| 82 | $C_3H_7$ | $CH_3$ | $\phi OCH_2CH_2$ |
| 83 | $C_4H_9$ | $C_2H_5$ | $\phi OCH_2CH_2CH_2$ |
| 84 | $CH_3O$ | H | $\phi OCH_2CH_2(CH_3)$ |
| 85 | $C_2H_5O$ | H | $\phi O(CH_2)_3CH_2$ |
| 86 | $C_3H_7O$ | H | $\phi OCH_2CH(CH_2CH_3)$ |

EXAMPLE 87

The following example illustrates the preparation of 1 - (3 - dimethylaminopropyl)-3,3-diphenylpiperazine, a compound of Formula IV.

The reaction may be illustrated:

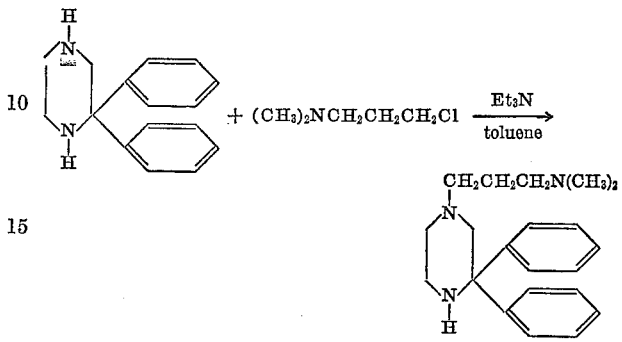

A mixture of 2,2-diphenylpiperazine (2.5 grams, 0.0105 mole), 3 - dimethylaminopropylchloride hydrochloride (1.66 grams, 0.0105 mole), and triethylamine (2.34 grams, 0.0241 mole) and dimethylformamide (20 ml.) was stirred at 70° C. for 4¾ hours. The mixture was poured into ice water (75 ml.). It was extracted with ether (175 ml. in 3 portions). The combined extracts were washed with saturated sodium chloride solution, dried over anhydrous magnesium sulfate and concentrated to give a residual oil (2.5 grams).

The fumarate was prepared by adding 2.324 grams (0.00719 mole) of the base in acetone (50 ml.) to a hot solution of fumaric acid (1.252 grams, 0.01078 mole) in acetone (150 ml.). The solid that was obtained on cooling was filtered off, washed and dried to give 2.59 grams of solid 1-(3-dimethylaminopropyl)-3,3-diphenylpiperazine, a 53.4 percent of theoretical yield, having a melting point of 165.5-168.5° C.

Analysis calculated for $C_{54}H_{70}N_6O_{12}$ (percent): C, 65.17; H, 7.09; N, 8.45. Found (percent): C, 64.69; H, 6.99; N, 8.44.

In the pharmacological evaluation described above, the product was found to be a mydriatic agent at 400 mg./kg. administered orally.

EXAMPLE 88

The following example illustrates the preparation of 1-(3-dimethylaminopropyl) - 3,3 - diphenylpiperazine, a compound of Formula IV. (See Example 93.)

The reaction may be illustrated:

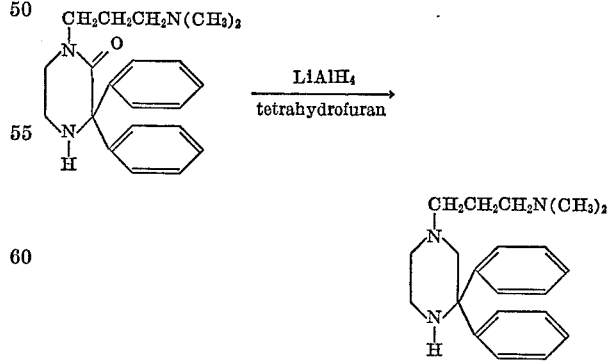

To a suspension of lithium aluminum hydride (3.8 grams, 0.1 mole) in dry tetrahydrofuran (100 ml.) is added, slowly, and with stirring, a solution of 1-(3-dimethylaminopropyl)-3,3-diphenyl - 2 - piperazinone (8.4 grams, 0.025 mole) in dry tetrahydrofuran. After addition is complete the reaction is stirred and refluxed 18 hours, then cooled. The reaction mixture is decomposed by the slow addition of water (12-14 ml.), followed by stirring for two hours. The inorganic material is filtered from the solution and washed with tetrahydrofuran and isopropyl alcohol. The solvent is removed by evaporation

11 at reduced pressure, and the residue is then taken up in ether, filtered clear, and treated carefully with dry hydrogen chloride. The product, 1-(3-dimethylaminopropyl)-3,3-diphenylpiperazine hydrochloride is purified by recrystallization from pentane-acetone.

EXAMPLE 89

The following example illustrates the preparation of 1-(3-dimethylaminopropyl) - 3,3 - diphenylpiperazine, a compound of Formula IV.

A mixture of 2,2-diphenylpiperazine (5.0 grams, 0.021 mole), 3 - dimethylaminopropylchloride hydrochloride (3.32 grams, 0.021 mole), triethylamine (4.26 grams, 0.042 mole) and toluene (75 ml.) was stirred at reflux for 26½ hours. The mixture was cooled, then filtered to remove the triethylamine hydrochloride formed. The filtrate was concentrated to dryness. The residue was dissolved in ether and filtered with the aid of Super-Cel. Addition of anhydrous hydrogen chloride followed by filtration gave 7.48 g. hydrochloride. Recrystallization from methanol-acetone gave 1.68 grams unreacted 2,2-diphenylpiperazine hydrochloride. The mother liquor was concentrated and the residue was recrystallized from isopropanol to give the product hydrochloride, 2.44 grams decomposing at about 130° C. This was converted to the base by treating its aqueous solution with potassium carbonate to pH 10 and extracting three times with ether. The ethereal extracts were combined, washed with saturated aqueous sodium chloride solution, dried over anhydrous magnesium sulfate and freed of solvent to give the product as an oil, 1.4 grams.

The base was converted to the fumarate by adding 1.240 grams (0.00383 mole), in acetone (20 ml.) to a boiling solution of fumaric acid (0.668 gram, 0.00575 mole) in acetone (100 ml.). The solution was concentrated to a volume of 100 ml. The solid which precipitated on chilling was recrystallized from methanol-acetone to give the fumarate, 1.40 grams, melting at 165–166.5° C.

Analysis calculated for $C_{27}H_{35}N_3O_6$ (percent): C, 65.17; H, 7.09; N, 8.45. Found (percent): C, 64.69; H, 6.99; N, 8.44.

EXAMPLE 90

The following example illustrates the preparation of 1-allyl-3,3-diphenylpiperazine, a compound of Formula IV.

A mixture of 2,2-diphenylpiperazine (5.0 grams, 0.021 mole), allyl bromide (2.55 grams, 0.021 mole), triethylamine (2.13 grams, 0.021 mole) and toluene (75 ml.) was stirred at reflux for 28¾ hours. The mixture was then cooled and filtered to remove the triethylamine hydrobromide formed. The filtrate was freed of solvent to give 8.3 grams oil.

The base was converted to the fumarate by adding a solution of 6.19 grams to a boiling solution of fumaric acid (2.58 grams) in acetone (300 ml.). The resulting solution was freed of solvent and the residue recrystallized twice from ethyl acetate to give the fumarate, 5.00 grams, melting at 174–175° C.

Analysis calculated for $C_{23}H_{26}N_2O_4$ (percent): C, 70.03; H, 6.64; N, 7.10. Found (percent): C, 70.04; H, 6.41; N, 6.99.

In the pharmacological evaluation described above, the product was found to be a mydriatic agent at 127 mg./kg. administered orally. The highest dose administered was 400 mg./kg. and was non-lethal.

EXAMPLE 91

The following example illustrates the preparation of 1-adamantoyl-3,3-diphenylpiperazine, a compound of Formula IV.

To a solution of 2,2-diphenylpiperazine (5.00 grams, 0.021 mole) and triethylamine (2.13 grams, 0.021 mole) in acetone (20 ml.) was added a solution of 1-adamantanecarboxylic acid chloride (4.18 grams, 0.021 mole) in acetone (30 ml.) over a period of ⅓ hour. The mixture

12 was stirred at reflux for 4 hours, then cooled. The solid was filtered off, washed and dried. The solid was then triturated with water, filtered and dried. Recrystallization from acetonitrile gave the product, 4.99 grams (59.3% yield) melting at 182–184° C.

Analysis calculated for $C_{27}H_{32}N_2O$ (percent): C, 80.96; H, 8.05; N, 6.99. Found (percent): C, 81.20; H, 8.18; N, 7.12.

EXAMPLE 92

The following example illustrates the preparation of α,3,3-triphenyl-1-piperazineethanol, a compound of Formula IV.

A solution of 2,2-diphenylpiperazine (5.0 grams, 0.021 mole) in benzene (20 ml.) was heated to 60° C. A solution of styrene oxide (2.53 grams, 0.021 mole) in benzene was added at 60° C. over a period of ¼ hour. The solution was stirred at reflux for 3 hours, then cooled and freed of solvent. The residue was recrystallized from ether-pentane to give the product, 2.88 grams (38.3 percent yield) melting at 120–121° C.

Analysis calculated for $C_{24}H_{26}N_2O$ (percent): C, 80.41; H, 7.31; N, 7.82. Found (percent): C, 80.16; H, 7.42; N, 7.73.

EXAMPLE 93

The following example illustrates the preparation of 1-(3-dimethylaminopropyl)-3,3-diphenyl - 2 - piperazinone, a compound of Formula VI.

The reaction may be illustrated:

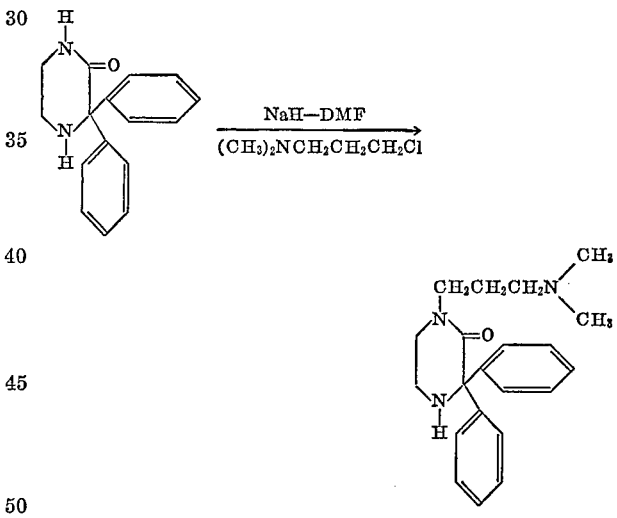

To a suspension of sodium hydride (0.88 gram, 0.02 mole of a 55 percent by weight dispersion in mineral oil) and dimethylformamide (10 ml.) was added a solution of 3,3-diphenyl-2-piperazinone (5.05 grams, 0.02 mole) in dimethyl formamide (45 ml.) over a period of ¼ hour. The mixture was stirred at room temperature for 1¼ hours after completion of the addition. A solution of freshly distilled 3-dimethylaminopropylchloride (2.44 grams, 0.02 mole) in dimethylformamide (20 ml.) was added over a period of ¼ hour. The mixture was stirred at room temperature for 23 hours, then poured into water (150 ml.). The mixture was acidified to pH 1 with concentrated hydrochloric acid. After extraction with petroleum ether (3 portions, 50 ml. each), it was basified to pH 12 with 50 percent aqueous sodium hydroxide. The resulting mixture was extracted with ether (3 portions, 100 ml. each). The combined extracts were dried over magnesium sulfate, filtered and concentrated. The residue was dissolved in boiling acetone-cyclohexane (300 ml.). The solution was concentrated to half volume. The solid that was formed on chilling was recovered to give 1.84 grams unreacted 3,3-diphenyl-2-piperazinone. The mother liquor was concentrated to a volume of 10 ml. The solid that was formed on chilling was filtered off and recrystallized twice from cyclohexane to give 1.12 grams of product 1-(3-dimethylaminopropyl)-3,3-diphenyl-2-piperazinone, having a melting point of 78–81° C., (a 16.6 percent of theoretical yield).

Analysis calculated for $C_{21}H_{27}N_3O$ (percent): C, 74.74; H, 8.07; N, 12.45. Found (percent): C, 74.97; H, 8.07; N, 12.32.

In the pharmacological evaluation described above, the product was found to be a mydriatic agent at 400 mg./kg. administered orally.

EXAMPLES 94–105

Following the procedure of Example 93 but substituting appropriate starting materials for 3,3-diphenyl-2-piperazinone and 3-dimethylaminopropylchloride, the following substituents of $R^1$, $R^2$, and A may be obtained when B is oxo. As used below $C_4H_8N$ is pyrrolidino, $C_5H_{10}N$ is piperidino and $C_4H_8NO$ is morpholino.

| Example | $R^1$ | $R^2$ | A |
| --- | --- | --- | --- |
| 94 | $C_2H_5$ | H | $(CH_3)_2NCH_2CH_2$ |
| 95 | $C_3H_7$ | H | $(C_2H_5)_2N(CH_2)_2CH_2$ |
| 96 | $C_4H_9$ | H | $(CH_3)_2NCH_2CH(CH_3)$ |
| 97 | $CH_3$ | $CH_3$ | $(C_2H_5)_2N(CH_2)_3CH_2$ |
| 98 | $C_3H_7$ | $CH_3$ | $(CH_3)_2NCH_2CH_2$ |
| 99 | $C_4H_9$ | $C_2H_5$ | $(CH_3)_2NCH_2CH_2$ |
| 100 | $CH_3O$ | H | $(C_2H_5)_2N(CH_2)_2CH_2$ |
| 101 | $C_2H_5O$ | H | $(CH_3)_2NCH_2CH(CH_3)$ |
| 102 | $C_3H_7O$ | H | $(C_2H_5)_2N(CH_2)_3CH_2$ |
| 103 | H | H | $(C_4H_8N)CH_2CH_2$ |
| 104 | H | H | $(C_5H_{10}N)(CH_2)_2CH_2$ |
| 105 | H | H | $(C_4H_8NO)CH_2CH_2$ |

EXAMPLE 106

The following example illustrates the preparation of 1-methyl-3,3-diphenyl-2-piperazinone, a compound of Formula VI.

To a suspension of sodium hydride (0.88 gram, 0.02 mole of a 55 percent dispersion in mineral oil) and dimethyl formamide (10 ml.) was added a solution of 3,3-diphenylpiperazine-2-one (5.05 grams, 0.02 mole) over a period of ½ hour. The mixture was stirred at 50° C. for 1 hour, then cooled to 30° C. A solution of methyl-iodide (2.84 grams, 0.02 mole) in dimethylformamide (10 ml.) was added in 10 minutes. The mixture was stirred at 50° C. for 24 hours. It was cooled, then poured into water (200 ml.) and acidified to pH 1 with concentrated hydrochloric acid. It was extracted three times with light petroleum ether. The aqueous phase was basified to pH 12 with 50 percent sodium hydroxide and then extracted three times with ether. The combined ethereal extracts were washed with saturated aqueous sodium chloride solution, dried over anhydrous sulfate and freed of solvent. The residue was recrystallized twice from acetonecyclohexane and once from benzene-pentane to give the product, 1.55 grams (29.1 percent yield) melting at 150–153° C.

Analysis calculated for $C_{17}H_{18}N_2O$ (percent): C, 76.66; H, 6.81; N, 10.52. Found (percent): C, 76.44; H, 6.74; N, 10.72.

In the pharmacological evaluation described above the product was found to be a mydriatic agent at 127 mg./kg. administered orally. The highest dose administered was 400 mg./kg. and was non-lethal.

What is claimed is:

1. The compound having the formula:

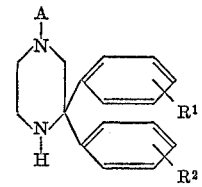

where A is selected from the class consisting of hydroxy (lower) alkyl and omega-hydroxy-omega-phenyl(lower) alkyl, and $R^1$ and $R^2$ are the same or different members selected from the class consisting of hydrogen, halogen, lower alkyl and lower alkoxy.

2. A compound as defined in claim 1 which is: α,3,3-triphenyl-1-piperazineethanol.

3. A compound as defined in claim 1 which is: 3,3-diphenyl-1-piperazineethanol.

References Cited

UNITED STATES PATENTS

| | | | |
| --- | --- | --- | --- |
| 3,663,548 | 5/1972 | Nitta et al. | 260—268 R |
| 2,400,022 | 5/1946 | Pollard | 260—268 R |
| 2,633,467 | 3/1953 | De Benneville | 260—268 M K |
| 2,649,450 | 8/1953 | Strong et al. | 260—268 M K |
| 3,390,139 | 6/1968 | De Benneville | 260—268 M K |
| 3,631,047 | 12/1971 | Freed et al. | 260—268 R |

OTHER REFERENCES

Roderick et al., Jour. Med. Chem., vol. 9, p. 181–85 (1966).

DONALD G. DAUS, Primary Examiner